(12) United States Patent
Chunduru et al.

(10) Patent No.: US 6,344,746 B1
(45) Date of Patent: Feb. 5, 2002

(54) METHOD FOR PROCESSING THE LAPSE MEASUREMENTS

(75) Inventors: Raghu K. Chunduru; Alberto G. Mezzatesta, both of Houston; Rainer Busch, Missouri City, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/454,690

(22) Filed: Dec. 3, 1999

(51) Int. Cl.$^7$ .................................................. G01V 3/18
(52) U.S. Cl. ........................ 324/339; 324/338; 324/335; 702/7
(58) Field of Search ................................. 324/338, 339, 324/335, 340, 341, 342, 343, 233; 364/422; 702/7, 6; 73/132.03

(56) References Cited

U.S. PATENT DOCUMENTS

| | | | | |
|---|---|---|---|---|
| 4,209,747 A | * | 6/1980 | Huchital | 324/338 |
| 4,360,777 A | | 11/1982 | Segesman | 324/339 |
| 4,897,605 A | * | 1/1990 | Cox et al. | 324/341 |
| 5,389,881 A | * | 2/1995 | Bitter et al. | 324/338 |
| 5,469,062 A | | 11/1995 | Meyer, Jr. | 324/338 |
| 5,581,024 A | * | 12/1996 | Meyer, Jr. et al. | 73/152.03 |
| 5,841,241 A | | 11/1998 | Nilssen | 315/244 |
| 5,870,690 A | | 2/1999 | Frenkel et al. | 702/7 |

FOREIGN PATENT DOCUMENTS

WO        WO98/00733        1/1998

* cited by examiner

Primary Examiner—Glenn W. Brown
Assistant Examiner—Subhash Zaveri
(74) Attorney, Agent, or Firm—Madan, Mossman & Sriram P.C.

(57) ABSTRACT

Resistivity data acquired at two different epochs using different types of tools are jointly inverted. For example, a multiple propagation resistivity (MPR) tool is run first, preferably at several frequencies and several transmitter-receiver spacings. At a later epoch, an induction tool may be run, preferably on a wireline. The joint inversion process identifies bed boundaries based on inflection points in the propagation resistivity and induction logging raw data. An initial guess for an uninvaded earth model is generated using the selected bed boundaries and the apparent raw resistivity values. An inversion run using shallow measurements of propagation resistivity logging data is performed to estimate a resistivity structure representative of the near borehole zone resistivity (invaded zone). The bed boundary positions of the layers are also updated as part of the inversion process. Synthetic data for both the shallow and deep measurements are generated to delineate the invasion zones. If the data match is good for both shallow and deep subarrays, then the model obtained from the shallow data is used as the final model for the inversion. In the event the data match is good for short subarrays and not for long subarrays, a final inversion run is performed by introducing invasion in the earth model. The method may be used for inverting data obtained from wireline, MWD or permanently implanted sensors at two or more epochs.

36 Claims, 2 Drawing Sheets

METHOD FOR PROCESSING THE LAPSE MEASUREMENTS

BACKGROUND OF THE INVENTION

1. Field of the Invention

The present invention relates to a method for simultaneous processing of geophysical data acquired at different times. Specifically, Measurement-While-drilling (MWD) and wireline resistivity data acquired at different times with tools having different resolution under different borehole conditions are simultaneously inverted to obtain parameters relating to the formation and the vicinity of the borehole.

2. Background of the Art

Various embodiments of electromagnetic, nuclear and acoustic measurements have been made for many years to determine geophysical properties of earth formations penetrated by a borehole. These measurements are usually displayed as a function of depth within the borehole at which they were measured forming a display known in the industry as a "log" of the borehole. The log of spontaneous potential of earth formations penetrated by a borehole was made in 1927 using a wireline device. In the following decades, borehole measurements using wireline devices were expanded to include nuclear and acoustic measurements, as well as more sophisticated electromagnetic measurements, to determine additional geophysical parameters of interest, and to also determine certain properties of the borehole.

Historically, measurements of formations have been made using wireline techniques in which sensors conveyed on a wireline are used to make various types of measurements from which formation and borehole properties are determined. For example, electromagnetic induction logs typically are measured by an instrument which includes a transmitter, through which a source of alternating current (AC) is conducted, and includes receivers positioned at spaced apart locations from the transmitter. The AC passing through the transmitter induces alternating electromagnetic fields in the earth formations surrounding the instrument. The alternating electromagnetic fields induce eddy currents within the earth formations. The eddy currents tend to flow in "ground loops," which are most commonly coaxial with the instrument. The magnitude of the eddy currents can be related to the electrical conductivity (the inverse of the resistivity) of the earth formations. The eddy currents generate alternating secondary magnetic fields which, in turn, induce voltages in the receivers which, generally speaking, are proportional to the magnitude of the eddy currents. Various circuits are provided in the instrument to measure the magnitude of the induced voltages, and thus determine the conductivity (and therefore the resistivity) of the earth formations. Such a method is disclosed in Beard et al. (U.S. Pat. No. 5,841,281) wherein an induction well logging is inserted into the wellbore. The instrument includes a transmitter, a source of alternating current connected to the transmitter, and a receiver. The transmitter is energized with the alternating current, voltages induced in the receiver are recorded, and area enclosed with respect to a baseline, by voltage peaks present in the recorded voltages is determined. The enclosed area corresponds to the conductivity.

Within the last few years, use of MWD tools for obtaining subsurface information has become more common. Meyer et al. (U.S. Pat. No. 5,469,062) discloses an invention directed toward the measure of geophysical parameters of earth formations penetrated by a borehole in an MWD environment. The invention employs propagation resistivity techniques utilizing a downhole instrument comprising multiple, longitudinally spaced transmitters operating at different frequencies with a plurality of longitudinally spaced receiver pairs. An electromagnetic wave is propagated from the transmitting antenna coil into the formation in the vicinity of the borehole and detected as it passes the receiving antenna of the receiver pair. The basic parameters measured at the receivers are the amplitude and phase shift of the sensed electromagnetic wave. The downhole instrument is conveyed along the borehole by a drill string or other means thereby making the basic measurements as a function of position or depth of the downhole instrument within the borehole. A plurality of parameters of interest can be determined by combining the basic measurements.

In the preferred embodiment disclosed by Meyer, both amplitude and phase measurements are made at two frequencies of 400 KHz and 2 MHZ and at two effective transmitter-receiver spacings. This yields a total of eight independent measurements per depth interval as the borehole device is conveyed along the borehole. In principle the set of eight equations can be solved for eight "unknowns." The unknowns include the geophysical formation properties of resistivity and dielectric constant, and additional parameters quantifying invasion and borehole properties such as rugosity and ellipticity. The latter borehole parameters have been considered as sources of "noise" in prior art resistivity measurements. When quantified, however, such borehole characteristics provide useful information concerning rock properties and the effectiveness of the drilling program.

MWD measurements are, as the name implies, made while a borehole is being drilled. The environment in which the sensors operate is much more hostile than the environment in which wireline devices operate. In addition, while a borehole is being drilled, there is less of a problem with "invasion" than when making wireline measurements. Invasion refers to the degree to which the fluid within a borehole migrates into, or "invades" a formation surrounding the borehole. In an MWD environment, the measurements are typically made within a few minutes of the drilling of the borehole since the sensors are typically within a few feet of the drill bit, so that there is less likelihood of invasion. In contrast, wireline measurements are typically made several hours, days or even weeks after a borehole has been drilled. During this time interval, the borehole fluid may be changed and there is plenty of time for the borehole fluid to invade the formation. As a result of this, even if identical sensors were used to make the same measurements during drilling and days later on a wireline, the measurements made by the sensors will almost invariably be different because of invasion. The invaded zone typically has different electrical properties than the uninvaded formation. This makes a direct comparison of the measurements difficult. Furthermore, a comparison of the results of interpretation of the measurements made in two different epochs is even more problematic.

A second problem with evaluating measurements and interpretations made at different epochs using different tools arises from the differences in vertical resolution and depth of investigation of the tools that are used. Propagation resistivity tools of the type discussed in Meyer commonly operate at frequencies between 400 kHz and 2 MHZ. In contrast, induction logging tools commonly used in wireline applications operate at frequencies between 10 kHz and 200 kHz. The vertical resolution of a logging tool depends upon the wavelength of the interrogating signal: the shorter the wavelength, the finer the resolution. However, with increasing frequency, the depth of penetration decreases. A longer transmitter-receiver spacing, commonly referred to as a deep subarray, gives a greater depth of investigation, but gives rise to problems in resolving thin beds because the received signal includes effects of all intervening beds. A shorter transmitter-receiver spacing, commonly called a shallow subarray, has a smaller depth of penetration but may not have problems resolving thin beds. The shallower penetration means that a shallow subarray may not be able to accurately determine the depth of invasion of the formation by borehole fluids. For this reason, it is common to make measurements at different frequencies and different transmitter-receiver distances to get data with different resolution and depths of penetration.

Another level of complexity in the interpretation of well log resistivity measurements arises when the effects of anisotropy are considered. The prior art discussed above all assumed that the earth formations are isotropic. There have been numerous inventions that disclose the determination of anisotropic formation properties using induction logging tools. For example, Segesman et al. (U.S. Pat. No. 4,360,777) discloses an array of three individually energizable transmitter coils having mutually orthogonal axes. Electronic transmitter steering circuitry is provided for controlling the energizing means to electronically steer the direction of the magnetic moment resulting from the magnetic field components generated by the transmitter coils. An array of receiver coils is also provided along with receiver processing circuitry for processing signals induced in the receiver coils. The array of receiver coils preferably includes three receiver coils having mutually orthogonal axes. The receiver processing circuitry is capable of individually sensing the signals induced in the receiver coils and operates to combine the sensed signals. The receiver processing circuitry also includes electronic receiver steering circuitry for controlling the relative amplification of the sensed signals to steer the effective sensing direction of the receiver. The receiver steering circuitry is coordinated with the transmitter steering circuitry and is operative to rotate the effective sensing direction of the receiver in a plane perpendicular to the direction of the transmitter magnetic moment. Another example of a device for obtaining measurements of anisotropy is given in PCT publication WO 98/00733 on an application of Beard et al. With an arrangement of coils that are inclined to the borehole axis, the measurements may be processed to determine formation dip angles and anisotropic conductivities assuming a model of transverse isotropy. A transversely isotropic medium is characterized by a symmetry axis of infinite-fold rotational symmetry wherein the properties along the symmetry axis are different from properties in any direction in a plane orthogonal to the symmetry axis.

There is a need for a method of simultaneous processing and interpretation of well logs acquired at different epochs using tools of different resolution. Such an invention should preferably also be able to determine properties of anisotropic formations. The present invention satisfies this need.

SUMMARY OF THE INVENTION

The present invention is a method for joint inversion of data acquired at different epochs using different types of tools. In a preferred embodiment, a propagation resistivity tool is run first, preferably at several frequencies and several transmitter-receiver (T-R) spacings. At one or more later epochs, another tool run may be made, preferably on a wireline. The joint inversion process identifies bed boundaries based on inflection points in the propagation resistivity, induction logging, focused resistivity or other log data such as a gamma ray, density or an imaging tool. An initial guess for an uninvaded earth model is generated using the selected bed boundaries and the apparent raw resistivity values. An inversion run using shallow measurements of propagation resistivity and induction logging data is performed to estimate a resistivity structure representative of the near borehole zone resistivity (invaded zone). The bed boundary positions of the layers are also updated as part of the inversion process. Synthetic data for both the shallow and deep measurements are generated to delineate the invasion zones. If the synthetic data match from the shallow subarrays matches data from deep subarrays, then the model obtained from the shallow data is used as the final model for the inversion. In the event the data match is good for short subarrays and not for long subarrays, a final inversion run is performed by introducing invasion in the earth model.

BRIEF DESCRIPTION OF THE DRAWINGS

For detailed understanding of the present invention, reference may be made to the following detailed description of the preferred embodiment, taken together with the accompanying drawings, in which like elements have been given like numerals, wherein.

DETAILED DESCRIPTION OF THE PREFERRED EMBODIMENTS

Figure 1:
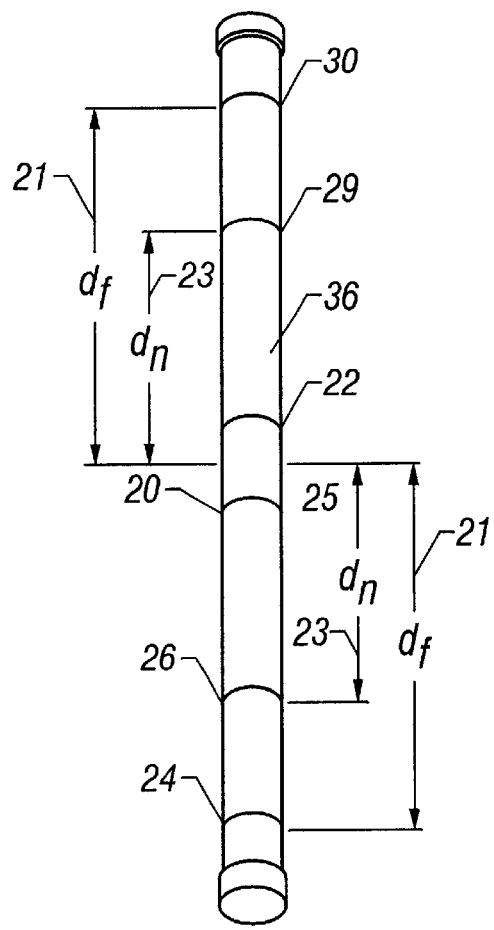
FIG. 1 (PRIOR ART) shows a view of transmitter and receiver arrays mounted on a drill collar in a Measurement-while-Drilling (MWD) apparatus for obtaining measurements of formation resistivities.

An arrangement of transmitters and receivers employed in an MWD environment for obtaining electromagnetic properties of a formation is illustrated in a very general manner in FIG. 1. A more detailed description may be found in U.S. Pat. No. 5,469,062 issued to Meyer, the contents of which are fully incorporated here by reference. The near spacing $d_n$ between transmitter and receiver is denoted by the numeral 23 and the far spacing $d_f$ is denoted by the numeral 21. Both the near spacing distances 23 and far spacing distances 21 are measured with respect to the midpoint 25 between the receivers 20 and 22. Point 25 is commonly referred to as the "measure point" of the borehole instrument. For transmitter frequency $\omega_1$ the phases of the signal detected at receivers 20 and 22 resulting from the sequential transmission from transmitters 26 and 29 are combined algebraically to obtain $R_{\phi,n,1}$. More specifically, transmitter 26 is activated and "raw" phase shifts of the transmitted signal are measured at both receiver 20 and 22. The difference of these two phase shift measurements is computed yielding a first relative phase shift between receivers 20 and 22. Transmitter 29 is activated and raw phase shifts are again measured at both receivers 22 and 20, and a second relative phase shift is computed from the difference of these two raw phase shift measurements. The first and second relative phase shift measurements are then averaged yielding an average relative phase shift for the effective transmitter-receiver pair spacing 23 from which the apparent resistivity $R_{\phi,n,1}$ is computed. The amplitudes of these received signals are simultaneously measured and combined yielding $R_{a,n,1}$. More specifically, transmitter 26 is activated and "raw" amplitude attenuations of the transmitted signal are measured at both receiver 20 and 22. The ratio of these two amplitude attenuation measurements is computed yielding a first relative amplitude attenuation between receivers 20 and 22. Transmitter 29 is activated and raw amplitude attenuations are again measured at both receivers 22 and 20, and a second relative amplitude attenuation is computed from the ratio of these two raw amplitude attenuation measurements. The first and second relative amplitude attenuation measurements are then averaged yielding an average relative amplitude attenuation for the effective transmitter-receiver pair spacing 23 from which the apparent resistivity $R_{a,n,1}$ is computed. Again for a transmitter frequency $\omega_1$ the phase of the signals received at receivers 20 and 22 resulting from the sequential transmission from transmitters 24 and 30 are likewise combined algebraically to obtain $R_{\phi,f,1}$. The amplitudes of these signals are likewise simultaneously measured and combined yielding $R_{a,f,1}$. The above sequence is repeated with a second transmitter frequency $\omega_2$ yielding $R_{\phi,n,2}$, $R_{a,n,2}$, $R_{\phi,f,2}$ and $R_{a,f,2}$. The end result is eight apparent resistivity measurements, comprising a total of thirty-two amplitude and phase shift measured at two transmitter-receiver spacings and at two transmitter frequencies. These eight apparent resistivity measurements are parameters that characterize the actual resistivity of the formation as described below.

Formation resistivity well logs include electromagnetic induction logs. Electromagnetic induction logs typically are measured by an instrument which includes a transmitter, through which a source of alternating current (AC) is conducted, and includes receivers positioned at spaced apart locations from the transmitter. The AC passing through the transmitter induces alternating electromagnetic fields in the earth formations surrounding the instrument. The alternating electromagnetic fields induce eddy currents within the earth formations. The eddy currents tend to flow in "ground loops," which are most commonly coaxial with the instrument. The magnitude of the eddy currents can be related to the electrical conductivity (the inverse of the resistivity) of the earth formations. The eddy currents, in turn, induce voltages in the receivers which, generally speaking, are proportional to the magnitude of the eddy currents. Various circuits are provided in the instrument to measure the magnitude of the induced voltages, and thus determine the conductivity (and therefore the resistivity) of the earth formations.

Regardless of the kind of data being analyzed (propagation, induction or galvanic), inversion techniques may be used to determine formation parameters. For example, the Meyer patent utilizes the eight previously defined measurements of apparent resistivity along with the comprehensive model of the response of the borehole instrument in a variety of formation and borehole conditions to simultaneously determine formation and borehole parameters of interest.

The system of equations that needs to be solved in the present invention for analyzing data acquired at different epochs by the same or different tools can be represented as $$d_{ij}=f_i(m_o, m_j)+\epsilon_{ij} \quad (1)$$

where i=1, 2, 3, ... $n_i$ is an index of the type of instrument used;

j=1, 2, 3, $n_t$ is an index of the logging epoch;

where $d_{ij}$ represents a vector of measurements made at epoch j by instrument i, $\epsilon_{ij}$ is the noise in the measurements made at epoch j, $m_o$ represents the epoch-independent portion of the model parameters, while $m_j$ is the portion of the model that depends upon the epoch j. With this formulation, the present invention can perform (as described below) a simultaneous inversion of data that is (i) acquired by the same logging tool at different epochs, (ii) different logging tools at different epochs, or (iii) a combination of both. Note that in the present formulation, even if the same logging tool is run at different epochs, the epoch dependent portion $m_j$ of the model could be different for the different epochs if invasion has occurred between the logging runs.

The model parameters are determined in a joint inversion by minimizing the error function $$S = \sum_{ij} \|\epsilon_{ij}\|^2 \quad (2)$$

$$= \sum_{ij} \|d_{ij} - f_i(m_o, m_j)\|^2$$

$$= \sum_{ij} [d_{ij} - f_i(m_o, m_j)]^T [d_{ij} - f_i(m_o, m_j)]$$

with respect to $m_o$ and $m_j$. In equation (2), the $^T$ denotes the transpose of a matrix. The minimization of (2) is a nonlinear problem and the solution is obtained by solving a sequence of linearized equations of the form $$g=J\delta \quad (3)$$

where g is a data discrepancy vector, $\delta$ is a parameter change vector and J is a Jacobian matrix of partial derivatives relating the data to the measurements.

The solution of equation (3) is obtained by minimizing $$S=\|g-J\delta\|^2 \quad (4)$$

Solution of (4) may be obtained using the Marquard-Levemberg method as $$\delta=(J^TJ+\beta I)^{-1}J^Tg \quad (5)$$

where $\beta$ is a Lagrange parameter for damping and I is the identity matrix. In one embodiment the present invention, measurements are made at two different epochs using, for example, a propagation resistivity tool and an induction tool. In such a case, the Jacobian matrix for a single layer takes the form:

$$J = \begin{bmatrix} \dfrac{\partial f_1}{\partial m_o} & \dfrac{\partial f_1}{\partial m_1} & 0 \\ \dfrac{\partial f_2}{\partial m_0} & 0 & \dfrac{\partial f_2}{\partial m_2} \end{bmatrix} \quad (6)$$

The upper portion of the Jacobian corresponds to measurements made at the first epoch and the lower portion of the Jacobian corresponds to measurements made at the second epoch. The first group of columns corresponds to partial derivatives with respect to model parameters that are epoch independent, the second group of columns corresponds to partial derivatives with respect to model parameters at the first epoch and the third group of columns corresponds to partial derivatives with respect to model parameters at the second epoch.

Figure 2:
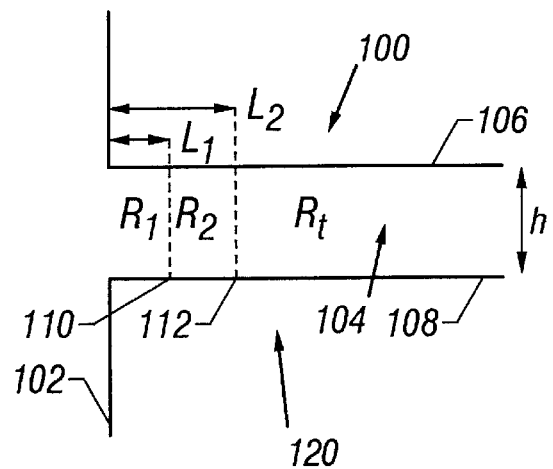
FIG. 2 illustrates the model parameters for a single layer model.

In the physical world, for a single layer, this may be denoted by FIG. 2. Depicted in FIG. 2 is a formation 104 having a thickness h between formations 100 and 120. The borehole wall is depicted by 102. In this borehole, measurements are made at two epochs: at the first epoch, the formation 104 has been invaded to a position 110 at a depth $L_1$ from the borehole by borehole fluids while at the second epoch, the formation 104 has been invaded to a position 112 at a depth $L_2$ from the boreholebyborehole fluids. The resistivities of the invaded zone are $R_1$ at the first epoch and $R_2$ at the second epoch while the resistivity of the uninvaded formation 104 is $R_t$. In this example, $m_o$ is made up of the model parameters h and $R_t$, $m_1$ is composed of $L_1$ and $R_1$ while $m_2$ is composed of $L_2$ and $R_2$. Those versed in the art would recognize that where the subsurface is anisotropic, the invaded zone may be characterized by vertical and horizontal reisitivities at the two epochs and the uninvaded formation may be similarly characterized by a vertical and horizontal resistivity.

In the example of FIG. 2, the Jacobian matrix is of the form:

$$J = \begin{bmatrix} \frac{\partial r_1}{\partial h} & \frac{\partial r_1}{\partial R_t} & \frac{\partial r_1}{\partial L_1} & \frac{\partial r_1}{\partial R_1} & 0 & 0 \\ \frac{\partial r_2}{\partial h} & \frac{\partial r_2}{\partial R_t} & \frac{\partial r_2}{\partial L_1} & \frac{\partial r_2}{\partial R_1} & 0 & 0 \\ \vdots & \vdots & \vdots & \vdots & \vdots & \vdots \\ \frac{\partial r_{n1}}{\partial h} & \frac{\partial r_{n1}}{\partial R_t} & \frac{\partial r_{n1}}{\partial L_1} & \frac{\partial r_{n1}}{\partial R_1} & 0 & 0 \\ \frac{\partial s_1}{\partial h} & \frac{\partial s_1}{\partial R_t} & 0 & 0 & \frac{\partial s_1}{\partial L_2} & \frac{\partial s_1}{\partial R_2} \\ \frac{\partial s_2}{\partial h} & \frac{\partial s_2}{\partial R_t} & 0 & 0 & \frac{\partial s_2}{\partial L_2} & \frac{\partial s_2}{\partial R_2} \\ \vdots & \vdots & \vdots & \vdots & \vdots & \vdots \\ \frac{\partial s_{n2}}{\partial h} & \frac{\partial s_{n2}}{\partial R_t} & 0 & 0 & \frac{\partial s_{n2}}{\partial L_2} & \frac{\partial s_{n2}}{\partial R_2} \end{bmatrix} \quad (7)$$

In equation (7), $r_1, r_2, r_3, \ldots r_{n1}$ are resistivity values obtained by the tool run at the first epoch, e.g., the propagation resistivity tool, while $s_1, s_2, s_3, \ldots s_{n2}$ are resistivity values obtained by the tool run at the second epoch, e.g., the induction tool. In the present invention, $n_1$ and $n_2$ can be different, i.e., the measurements made and the resistivities derived at the first and second epoch may be quite different. There is no data relating $L_2$ and $R_2$, the depth and resistivity of the invaded zone at the second epoch, to resistivity values at the first epoch: accordingly, the corresponding partial derivatives are zero. Similarly, there is no data relating $L_1$ and $R_1$, the depth and resistivity of the invaded zone at the first epoch, to resistivity values at the second epoch: accordingly, the corresponding partial derivatives are also zero. Those versed in the art would recognize that the methodology described above in setting up the model parameters could also be used for measurements made at more than two epochs using one or more logging tools. Such modifications are intended to be within the scope of the claimed invention.

The present invention allows for the possibility that the tool response function for the first and second epochs may also be different, so that there need not be any systematic relations between the terms of the Jacobian matrix for the first and second epochs.

Another embodiment of the invention uses measurements obtained from transverse electromagnetic induction logging. Such an apparatus has been described in Forgang et al. (U.S. Pat. No. 5,781,436) having the same assignee as the present application and the contents of which are fully incorporated here by reference. The method comprises selectively passing an alternating current through a plurality of transmitter coils inserted into the wellbore. Each of the transmitter coils has a magnetic moment direction different from the magnetic moment direction of the other ones of the transmitter coils. The alternating current includes a first and a second frequency. The amplitude at the first frequency has a predetermined relationship to the amplitude at the second frequency.

By suitable analysis of the data, it is possible to determine anisotropic properties of formations wherein the resistivity parallel to a symmetry axis, usually the normal to the bedding plane of the formation, is different from the resistivity parallel to the bedding plane. In the present invention, this simply requires the incorporation of additional components in the measurement and data vectors and determining the appropriate tool response functions.

Figure 3:
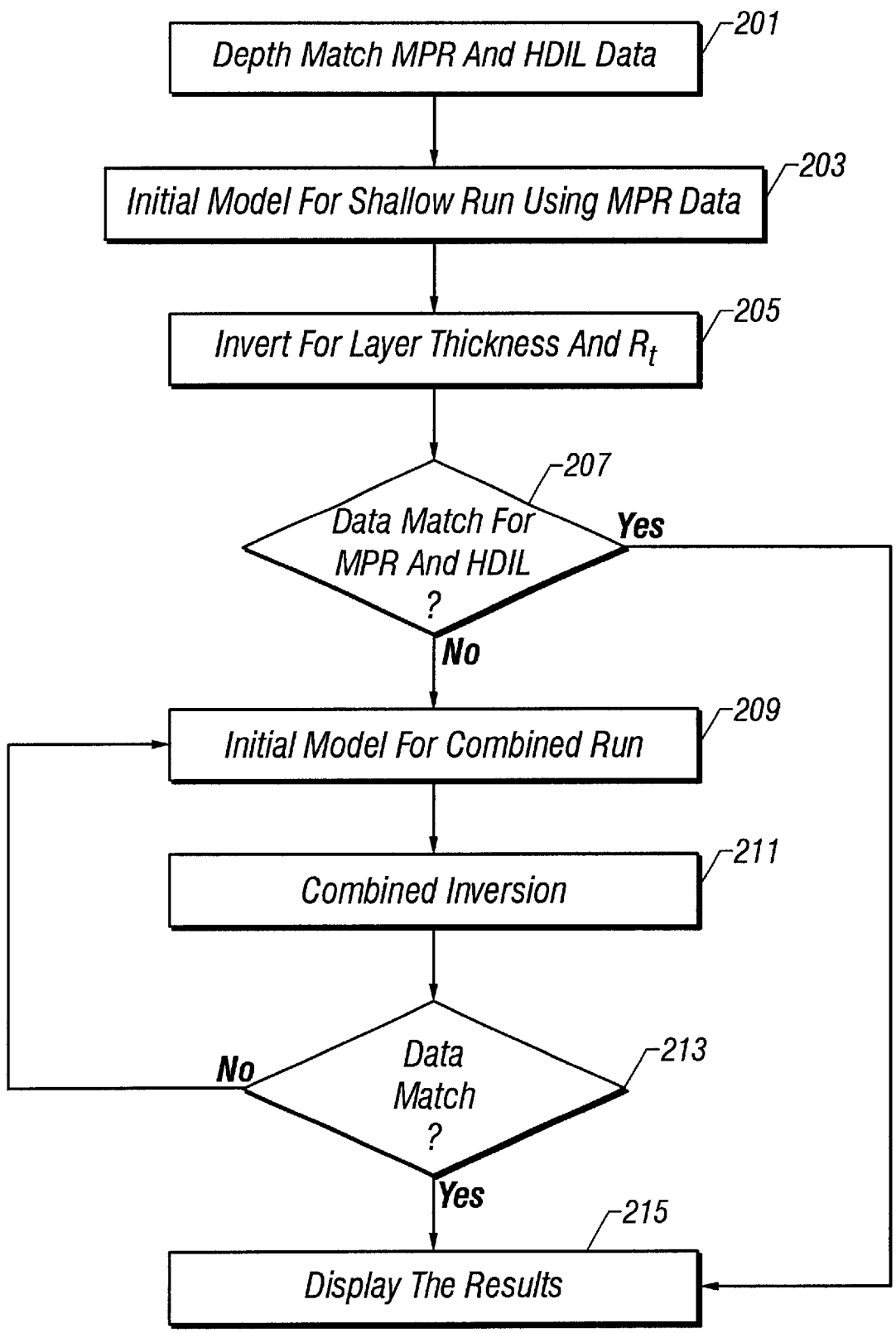
FIG. 3 illustrates the major steps in the implementation of the present invention.

Turning now to FIG. 3, the steps in the present invention are illustrated. Starting at 201, the data from the first and second epochs are matched in depth. Here, the data from the first epoch are assumed to have been obtained using a multiple propagation resistivity tool, denoted by MPR, while the data from the second epoch are assumed to have been obtained using a high definition inductive logging tool, denoted by HDIL. The example of two different epochs is for illustrative purposes only and in actual practice, data from more than two epochs could be used. Furthermore, the use of MPR data for the first epoch and HDIL for the second epoch is also for illustrative purposes only and any combination of logging tools could be used. Various methods are known in prior art for obtaining this depth match. For example, if gamma-ray logs or density logs are run concurrently with the MPR and HDIL logging tools, then these additional logs can be used to establish a proper depth registration of the MPR and HDIL logs. Another method for depth correlation of multiple log measurements is given in Meyer et al. (U.S. Pat. No. 5,581,024).

An initial estimate for an uninvaded earth model is generated using the selected bed boundaries and the apparent raw resistivity values 203. In a preferred embodiment of the invention, these data are obtained from the shallow portion of the MPR data. In a common method of acquiring MPR data, as disclosed in Meyer, low frequency MPR data are typically obtained at a frequency of 400 kHz while high frequency data are typically obtained at a frequency of 2 MHZ. An inversion run using only these shallow measurements of MPR data is performed to estimate a resistivity structure representative of the formations 205. The bed boundary positions of the layers are also updated as part of the inversion process. This shallow inversion assumes a model in which there is no invasion and generally uses prior art inversion techniques. A check is made to see if synthetic data that are generated by this inverted model are in good correspondence with the resistivity values determined by the deep measurements in the MPR and HDIL devices (corresponding to long transmitter-receiver distances) 207. If the agreement is good, then it is an indication that there has been no invasion and the results of the inversion may be accepted 215.

If the agreement at 207 is not good, i.e., if the difference between the model output and the resistivity values determined by the deep measurements exceeds a predetermined threshold, then the model as determined at 207 is used as a starting estimate 209 for a joint inversion of the MPR and HDIL data 211 using the full range of transmitter-receiver distances and a model in which there is a change in the formation properties due to invasion between the first and second epochs. This nonlinear inversion process and, in particular, the Jacobian involved in the inversion, have been described above. This is an iterative inversion process and at each step in the inversion, the model output is compared to the resistivity values from the devices 213 and the iterations continue until a good match is obtained.

The example given above for the Jacobian was for a single invaded zone. In actual implementation, a plurality of layers are incorporated in the model and measurements are made over window including a plurality of depths. The model vector may have 20 to 30 elements and the measurement vector may have 500 elements, so that the Jacobian matrix is of the order of 20 to 30 by 500. As noted above, the present invention uses a generalized inversion of this Jacobian matrix to iteratively obtain a solution for equation 2.

The method illustrated in FIG. 3 is not limited to the use of MPR data at the first epoch and HDIL data at the second epoch. As noted above, logging runs may be made at multiple epochs using different logging tools or the same logging tool in different configurations (transmitter-receiver distance) or at different frequencies.

An alternate embodiment of the invention uses permanently installed sensors within a borehole. Methods for implanting such sensors would be known to those versed in the art and are not discussed further. By using such permanently implanted sensors, it is possible to closely monitor the flow of fluids into a producing borehole. For example, if it is found that the resistivity of the "virgin" formation $R_t$ is beginning to decrease systematically at successive epochs, this could be an indication that hydrocarbons are being replaced by water away from the borehole.

The method of the present invention may also be used with a model in which the resistivity model of the earth formations includes anisotropy and the raw data include measurements made from transverse induction logging. As would be known to those versed in the art, one of the additional parameters in such a model is an angle of inclination of the borehole axis to the bedding plane. As noted in Wu and Wisler two solutions exist to the nonlinear inversion problem for determination of anisotropic resistivities for a single dipping layer. However, when redundant measurements are made, as in the present invention, this ambiguity in the nonlinear inversion can be resolved. The method of the present invention may also be used for simultaneous inversion of data acquired at more than one epoch in an inclined or horizontal wellbore.

The above examples showing the use of the invention for joint inversion of resistivity data were for illustrative purposes only. The method of joint inversion disclosed above may also be use for obtaining other parameters of interest such as density, porosity and permeability of the formations using neutron, gamma ray or density logging. Those versed in the art would be familiar with the relationship between the raw measurements and the model parameters and how to define the Jacobian appropriately. Inversion of such data is intended to be within the scope of the present application.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method for determining a property of interest of earth formations penetrated by a borehole, said property experiencing change in the event of invasion of a borehole fluid into said formations over a period of time, the method comprising:

(a) acquiring at a first epoch a plurality of raw measurements indicative of said property of interest, said first plurality of measurements having a first level of resolution;

(b) acquiring at at least a second epoch a plurality of raw measurements indicative of said property of interest, said plurality of measurements at the second epoch having a second level of resolution, said property of interest at the second epoch being different from said property at the first epoch in the event of occurrence of said invasion of borehole fluids between the first and second epochs; and (c) simultaneously inverting parameter values derived from the first and second plurality of raw measurements for determining said property at the first epoch and the at least second epoch.

2. The method of claim 1 wherein the property of interest is at least one of (i) a thickness of an invaded zone in a formation, (ii) a depth of an invaded zone in a formation, (iii) a resistivity of an invaded zone in a formation, (iv) a horizontal resistivity of an invaded zone in a formation, (v) a vertical resistivity of an invaded zone in a formation, (vi) a resistivity of an uninvaded zone in a formation, (vii) a horizontal resistivity of a formation, (viii) a vertical resistivity of a formation, (ix) an inclination angle of an axis of the borehole to a bedding plane of a formation, (x) a permeability of a formation, (xi) a density of a formation, and (xii) a porosity of a formation.

3. The method of claim 1 wherein acquiring said first plurality of measurements at said first epoch further comprises using a multiple propagation resistivity tool in the borehole.

4. The method of claim 3 wherein the multiple propagation resistivity tool comprises a plurality of transmitters and a plurality of receivers defining a plurality of transmitter-receiver spacings, said plurality of transmitters adapted to operate at a first frequency and a second frequency.

5. The method of claim 3 wherein acquiring said plurality of measurements at said second epoch further comprises using an induction logging tool in the borehole.

6. The method of claim 5 wherein the induction logging tool comprises at least one transmitter and at least one receiver a defining a plurality of transmitter-receiver spacings, said at least one transmitter adapted to operate at at least one frequency.

7. The method of claim 6 wherein the plurality of transmitters comprises at a first transmitter coil having a first axis and a second transmitter coil having a second axis, said first axis inclined to said second axis.

8. The method of claim 1 wherein simultaneously inverting parameter values further comprises defining a model relating the property of interest to the parameter values.

9. The method of claim 8 wherein said model includes a tool response function.

10. The method of claim 8 further comprising obtaining a depth match of the first and second plurality of raw measurements.

11. The method of claim 8 further comprising obtaining an initial model from one of the (i) parameters derived from the first plurality of raw measurements, and, (ii) data from another logging tool.

12. The method of claim 11 further comprising performing a first inversion of parameters derived from a first portion of the first and second plurality of raw measurements using said initial model to obtain an updated model.

13. The method of claim 12 wherein performing the first inversion further comprises determining a difference between said parameters derived from the first portion of the first and second plurality of raw measurements and an output of the updated model.

14. The method of claim 12 further comprising performing a second inversion of parameters derived from a second portion of the first and second plurality of raw measurements using said updated model to obtain an improved model wherein said second portion is different from said first portion.

15. The method of claim 14 wherein performing the second inversion further comprises determining a difference between said parameters derived from the second portion of the first and second plurality of raw measurements and an output of the improved model.

16. The method of claim 1 wherein said plurality of raw measurements at the first and at least second epochs are obtained by at least one of (i) an instrument carried on a bottom hole assembly for measurement while drilling, (ii) an instrument carried on a wireline, and, (iii) a plurality of permanently installed sensors in the borehole.

17. The method of claim 1 wherein the at least second epoch further comprises a plurality of epochs.

18. The method of claim 1 wherein the second level of resolution is different from the first level of resolution.

19. The method of claim 1 wherein the second level of resolution is substantially equal to the first level of resolution.

20. The method of claim 1 wherein the at least second epoch further comprises a plurality of epochs and wherein the property of interest is a resistivity of an uninvaded zone of an earth formation at said plurality of epochs, the method further comprising using said plurality of determined resistivities of the uninvaded zone to monitor a replacement of hydrocarbons in a vicinity of the borehole by water.

21. The method of claim 1 wherein said first and at least second plurality of measurements are obtained using permanently implanted sensors in the borehole.

22. The method of claim 1 wherein the plurality of raw measurements at the first epoch are obtained using a transverse logging tool.

23. The method of claim 1 wherein the plurality of raw measurements at the at least second epoch are obtained using a transverse induction logging tool.

24. The method of claim 1 wherein the borehole is one of (i) a substantially vertical borehole, (ii) a borehole inclined to the vertical, and, (iii) a substantially horizontal borehole.

25. The method of claim 14 wherein the first and second inversions are iterative nonlinear inversions.

26. A method for determining a model characterizing properties of earth formations penetrated by a borehole, said properties experiencing change in the event of invasion of a borehole fluid into said formations over a period of time, the method comprising:

(a) obtaining a first plurality of apparent resistivities indicative of said properties at a first epoch;

(b) obtaining a second plurality of apparent resistivities indicative of said properties at a second epoch, a subset of said properties experiencing said change between the first epoch and the second epoch; and (c) performing a joint inversion of said first and second plurality of apparent resistivities and obtaining said model.

27. The method of claim 26 wherein said model comprise at least one of (i) a thickness of a layer in the formation, (ii) a depth of an invaded zone in a formation, (iii) a resistivity of an invaded zone in a formation, (iv) a horizontal resistivity of an invaded zone in a formation, (v) a vertical resistivity of an invaded zone in a formation, (vi) a resistivity of an uninvaded zone in a formation, (vii) a horizontal resistivity of a formation, (viii) a vertical resistivity of a formation, and, (ix) an inclination angle of an axis of the borehole to a bedding plane of a formation.

28. The method of claim 26 wherein obtaining said first plurality of apparent resistivities further comprises making measurements with a multiple propagation resistivity tool in the borehole.

29. The method of claim 28 wherein the multiple propagation resistivity tool comprises a plurality of transmitters and a plurality of receivers defining a plurality of transmitter-receiver spacings, said plurality of transmitters adapted to operate at a first frequency and a second frequency.

30. The method of claim 28 wherein obtaining said second plurality of resistivities further comprises making measurements with an induction logging tool in the borehole.

31. The method of claim 30 wherein the induction logging tool comprises at least one transmitter and at least one receiver a defining a plurality of transmitter-receiver spacings, said at least one transmitter adapted to operate at at least one frequency.

32. The method of claim 26 further comprising obtaining a depth match between the first and second plurality of apparent resistivities.

33. The method of claim 26 wherein the second plurality of apparent resistivities has a different level of resolution from a resolution of the first plurality of apparent resistivities.

34. The method of claim 28 wherein the multiple propagation resistivity tool comprises a transverse logging tool.

35. The method of claim 30 wherein the induction logging tool comprises a transverse logging tool.

36. The method of claim 26 wherein said joint inversion comprises an iterative nonlinear inversion.

* * * * *